A. MILLER.
COMBINED PAIL COVER AND STRAINER.
APPLICATION FILED FEB. 11, 1914.
1,117,418.  Patented Nov. 17, 1914.
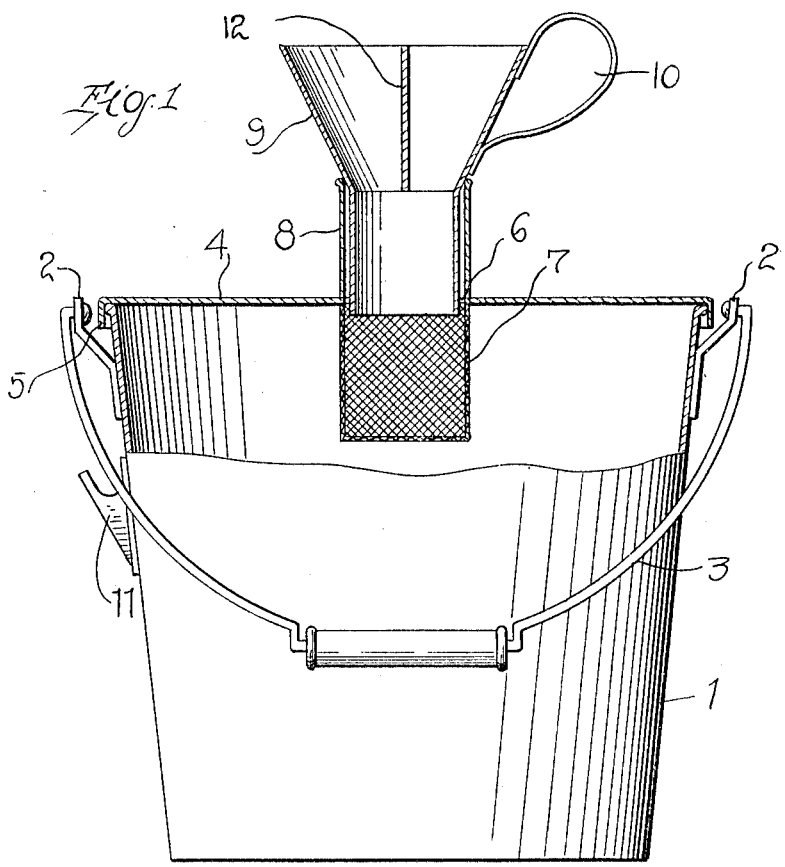
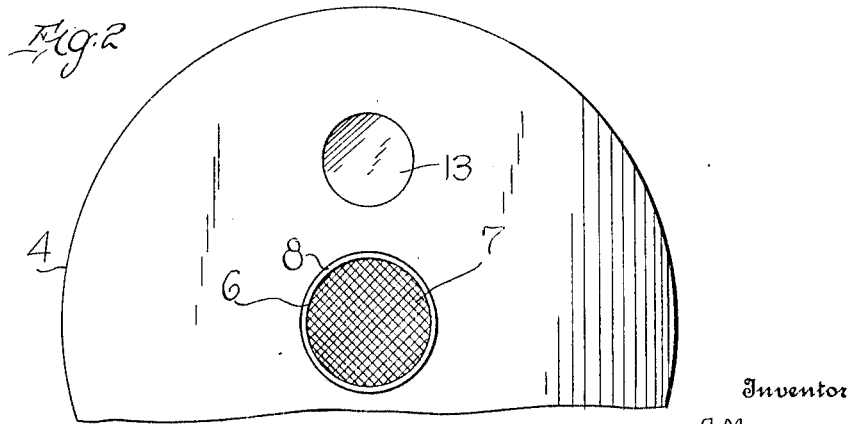
Witnesses
Robert M. Lutphen
A. L. Hind
Inventor
A Miller
By Watson E. Coleman
Attorney

UNITED STATES PATENT OFFICE.

ADOLPH MILLER, OF GREELEY, COLORADO.

COMBINED PAIL-COVER AND STRAINER.

1,117,418.  Specification of Letters Patent.  Patented Nov. 17, 1914.

Application filed February 11, 1914. Serial No. 818,157.

*To all whom it may concern:*

Be it known that I, ADOLPH MILLER, a citizen of the United States, residing at Greeley, in the county of Weld and State of Colorado, have invented certain new and useful Improvements in Combined Pail-Covers and Strainers, of which the following is a specification, reference being had to the accompanying drawings.

This invention relates to new and useful improvements in milk pails and more particularly to a combined cover and strainer which is to be removably secured to the top of the pail to protect the contents thereof during the milking operation.

Another object of the invention is the provision of a combined cover and strainer for a milk pail which will possess advantages in points of efficiency and durability, is inexpensive to manufacture and at the same time is simple in construction and operation.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a milk pail illustrating in cross section my improved attachment, and Fig. 2 is a top plan view.

Referring in detail to the drawings 1 indicates the milk pail which may be of any ordinary construction provided with the bails 2 upon opposite sides thereof, to which is secured the handle 3. The cover which is generally indicated by the numeral 4, is preferably constructed of the same material as the pail 1 and is provided with the flange 5 which is adapted to fit down over the upper edge of the pail to hold the cover against movement when placed upon the pail. The cover 4 is provided with a centrally arranged opening 6 and arranged beneath this opening upon the inner side of the cover is the screen wire 7, the edges of which are soldered or secured in a similar manner to the cover.

Secured to the top of the cover and arranged around the opening 6 is a cup member 8, the lower end of which is soldered or secured in a similar manner to the upper face of the cover. The cup member 8 is preferably cylindrical in form and of the same size as the diameter of the opening 6. In using the pail for milking, it is preferred to provide a removable funnel 9, the lower end of which is disposed within the cup 8 when milking so that the milk received in the funnel may be readily conveyed to the interior of the pail. This funnel 9 is provided with a handle 10 whereby the same may be quickly and readily placed within the cup or removed therefrom and when not in use may be carried in the hand or suspended from a suitable hook 11 secured to the side of the pail.

A guard member 12 is provided which is preferably flat in form, the ends of which extend down along the inner side walls of the funnel 9 and are secured thereto in any suitable manner. This guard member is adapted to be used to prevent the milk from spattering out of the funnel on to the milker.

In order to determine the amount of contents within the receptacle, I provide within the cover, a glass plate 13 whereby the milker will be able to see when the pail has become nearly full.

While I have shown and described the preferred form of my invention, it will be obvious that various changes in the details of construction and in the proportions may be resorted to for successfully carrying my invention into practice without sacrificing any of the novel features or departing from the scope of the appended claim.

Having thus described this invention, what I claim is:—

A cover for milk pails comprising a plate provided with a down-turned flange to embrace the edges of the pail and provided with a central orifice, a foraminous strainer secured to the under side of the cover and surrounding the opening, a collar secured to the upper side of the cover and surrounding the opening, and a funnel having a neck to fit within the collar.

In testimony whereof I hereunto affix my signature in the presence of two witnesses.

ADOLPH MILLER.

Witnesses:
C. E. NEWSON,
E. F. ONSTINE.

Copies of this patent may be obtained for five cents each, by addressing the "Commissioner of Patents, Washington, D. C."